United States Patent [19]

Pepper, Jr.

[11] 4,293,734
[45] Oct. 6, 1981

[54] TOUCH PANEL SYSTEM AND METHOD
[75] Inventor: William Pepper, Jr., Bethesda, Md.
[73] Assignee: Peptek, Incorporated, Bethesda, Md.
[21] Appl. No.: 14,450
[22] Filed: Feb. 23, 1979
[51] Int. Cl.³ .................... G08C 21/00; G01N 27/00
[52] U.S. Cl. ......................................... 178/18; 178/19
[58] Field of Search ............................ 178/18, 19, 20; 340/365 R, 365 S, 365 C, 365 A, 146.3 SY, 347 AD; 33/1 M; 250/207, 211 R, 211 K; 324/71 R, 71 EB

[56] References Cited

U.S. PATENT DOCUMENTS

| | | | |
|---|---|---|---|
| 3,691,382 | 9/1972 | Somer | 250/211 K |
| 3,699,439 | 10/1972 | Turner | 178/18 |
| 4,013,835 | 3/1977 | Eachus et al. | 178/18 |
| 4,018,989 | 4/1977 | Snyder et al. | 178/18 |
| 4,071,691 | 1/1978 | Pepper, Jr. | 178/19 |
| 4,121,049 | 10/1978 | Roeber | 178/18 |
| 4,129,747 | 12/1978 | Pepper, Jr. | 178/19 |
| 4,138,592 | 2/1979 | Capehart et al. | 178/19 |
| 4,198,539 | 4/1980 | Pepper, Jr. | 178/18 |

FOREIGN PATENT DOCUMENTS 1133757 11/1968 United Kingdom .

OTHER PUBLICATIONS

"What You Can Do With Just 10,000 Electrons", Brochure by Surface Science Laboratories; pages not numbered; before 1/1/79.

"A Position-sensitive Detector for Electrons", Moak and others; 1975; Journal of Electron Spectroscopy . . . , Netherlands; pp. 151–156.

Primary Examiner—Thomas A. Robinson
Attorney, Agent, or Firm—Jim Zegeer

[57] ABSTRACT

A general method is disclosed for accurately determining the location or position of a source or sink of electric current on the surface of a resistance element or impedance layer. Touch panels are described that detect the presence of a user's finger on such surface, and produce output signals corresponding to the position of the finger in one or more axes. A preferred embodiment discloses a touch panel that includes a signal generator and determines the position of the user's finger from current flowing through the user's body to ground. Another touch panel embodiment determines the position of the user's finger from currents caused by ambient electrical noise. A pressure-sensitive touch panel, a transparent touch panel for use with a video display, a touch-panel-controlled audio mixer, and a video game incorporating touch panels are also disclosed.

28 Claims, 14 Drawing Figures

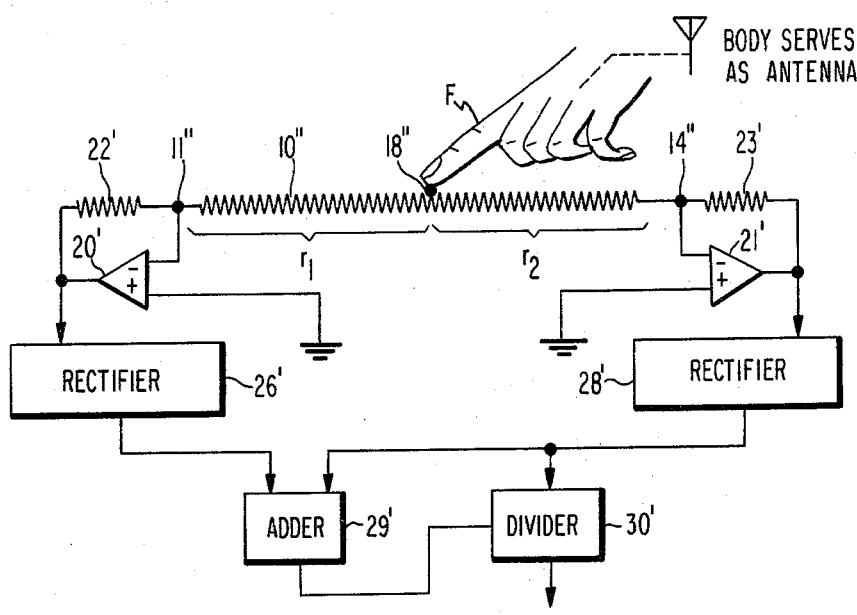
FIG 10
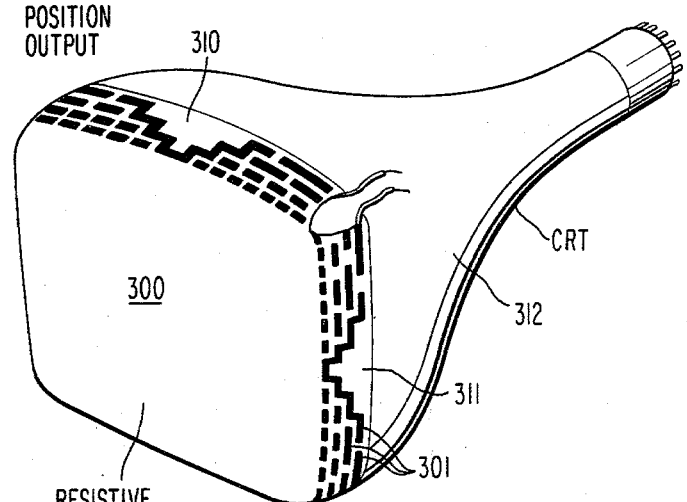
FIG 12
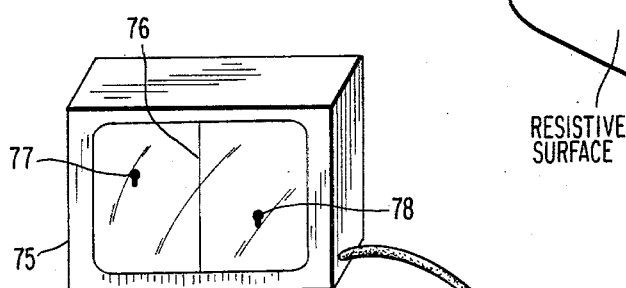
FIG 13
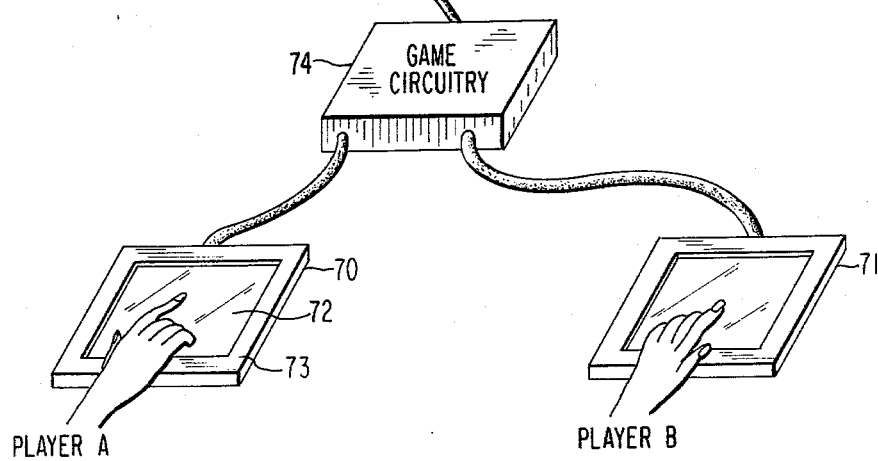

TOUCH PANEL SYSTEM AND METHOD

BACKGROUND OF THE INVENTION

This invention relates to devices for providing information, in the form of electrical signals, about the position of a selected touch point serving as a source or sink of electric current relative to a current-carrying resistance or impedance element. In particular, it relates to devices for converting selected touch points or positions on a surface (reflecting hand motions) into electrical signals to provide an interface between man and machine.

As used herein, the term "a selected touch point" means a point on a surface selectively touched by a portion of a human body, particularly a finger or toe, or a point on a surface touched by an instrument held in the hand or other portion of a human body and controlled by the human, or a point on a surface contacted by a mechanical contrivance which is guided by a human. In the context of this invention "selected" means the direction by the human intellect of the point on the surface that is touched.

In the context of this invention the term "point" encompasses the area of contact between a human finger and a surface, or the area of contact of an implement, such as the pointed end of a stylus, with a surface. Thus, it is intended that the term "selected touch point" exclude non-physically contacting transfers of electrical energy between the touch panel surface and a sensing device or transducer. As used herein the term "current collecting" includes electrical current passing to or from the impedance surface.

This invention is an improvement over the touch panels described in my U.S. Pat. Nos. 4,071,691 and 4,129,747, and my pending patent application Ser. No. 867,256, filed Jan. 5, 1978, now U.S. Pat. No. 4,198,539 dated Apr. 15, 1980, discussed in my aforementioned patent application Ser. No. 867,256, the phase of the field produced in the resistive surface was not a linear function of position on the surface, introducing an error in the output function unless special techniques were used to compensate for the error.

The present invention substantially overcomes the limitations of that earlier system. It does not require a pickup surface and is therefore easier to package and manufacture than the earlier system. It also has improved linearity. It will therefore be seen that it is an improvement in the art of human-machine interfacing.

An article, "A Position-Sensitive Detector for Electrons," by C. D. Moak, S. Datz, F. Garcia Santibanez, and T. A. Carlson, in the *Journal of Electron Spectroscopy and Related Phenomena*, No. 6, 1975, pp. 151–156, discloses the principle of locating, on one axis, the point on a linear resistive anode at which electrons emerge from a chevron multiplier (which was impinged upon by an electron beam) in a high-resolution electron spectrometer. In such system, a high D. C. voltage is required between the electron multiplier and the resistive strip collector.

BRIEF SUMMARY OF THE INVENTION

The object of the present invention is to provide improvements in touch panel systems and methods.

In one-axis form, a touch-panel embodiment of the invention includes an extended resistance or impedance element, such as a length of nichrome wire, having a terminal at each end or boundary and so disposed that it can be touched at different selected points along its length; an oscillator that varies the potential of both terminals simultaneously with respect to ground; current-sensing circuitry to measure the current through each terminal; and normalizing circuitry to produce an output signal proportional to the ratio of one of the currents to the sum of both currents. A level detector monitors the sum of both currents and provides a Presence signal when the sum exceeds a set or predetermined level.

In operation, when the user touches the resistance element, his body presents a relatively low impedance to ground for the oscillator signal, and a small electric current flows through the user's body. The fraction of this current flowing through a boundary is inversely proportional to the distance from the boundary of the point touched, and directly proportional to the distance from the other boundary. An output voltage is produced proportional to this fraction, and thus, to the distance from the other terminal. The Presence output provides a binary signal to the utilization device indicating that the resistance element is being touched.

In two-axis form, a rectangular surface of uniform resistivity is used that has four terminals and a resistive coupling network. The characteristics of this network are such that the ratio of the sum of the currents through two the terminals to the sum of the currents through all four terminals is proportional to the distance from one edge. In a manner similar to that described for the one-axis embodiment, output voltages are simultaneously derived proportional to the X-axis and Y-axis coordinates of the point touched. A two-axis touch panel can also be constructed using a triangular surface with three terminals.

BRIEF DESCRIPTION OF THE DRAWINGS

The above and other objectives, advantages and features of the invention will be fully understood from the following detailed description and accompanying drawings wherein:

FIG. 10 is a block diagram of a one-axis touch panel in which the current source is external to the touch panel.

FIG. 12 is a sketch showing a transparent touch panel combined with a display device.

FIG. 13 is a sketch of a video game in which a representation of the playing area appears on both the video display and the two touch panels.

DETAILED DESCRIPTION

Figure 1:
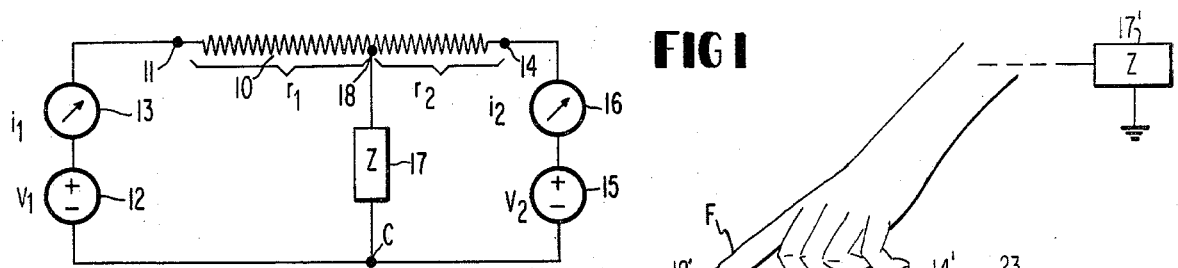
FIG. 1 is a schematic diagram illustrating the basic position-locating principle incorporated in the invention.

FIG. 1 is a schematic diagram illustrating the basic position-transducing principle employed by my invention. Extended impedance or resistance element 10 has a boundary terminal 11 connected to voltage source 12 through a current-measuring device, ammeter 13, and a boundary terminal 14 connected to voltage source 15 through a current-measuring device, ammeter 16. The other terminals of the voltage sources have a common connection C, and impedance 17 is connected between common connection C and an arbitrary point 18 on the extended resistance element. Let the total resistance of resistance element 10 be R and let the portion between point 11 and point 18 be $r_1$, and the portion between point 18 and point 14 be $r_2$, as indicated on the diagram. Using Kirchoff's voltage law, equations can be written for the two meshes of this circuit:

$$i_1 r_1 + (i_1 + i_2)Z + V_1 = 0 \tag{1}$$

$$i_2 r_2 + (i_1 + i_2)Z + V_2 = 0 \tag{2}$$

Subtracting Equation 2 from Equation 1, and substituting $R - r_1 = r_2$, it will be found that:

$$r_1 = \frac{i_2 R - v_1 + v_2}{i_1 + i_2}. \tag{3}$$

This can be rearranged to express the dimensionless ratio $r_1/R$ as the sum of two terms:

$$\frac{r_1}{R} = \frac{i_2}{i_1 + i_2} + \frac{v_2 - v_1}{(i_1 + i_2)R}.$$

The following three conclusions relevant to my invention can be drawn from Equation 4. First, the expression for ratio $r_1/R$ is independent of impedance Z (hence Z can vary) except that Z must be finite. Second, if the relationship between the position of point 18 and ratio $r_1/R$ is known, then the position of point 18 can be determined from measurements of currents $i_1$ and $i_2$ and voltages $v_1$ and $v_2$ (and knowledge of resistance R). Third, if $v_1 = v_2$, and the relationship between the position of point 18 and ratio $r_1/R$ is known, the position of point 18 can be determined solely from measurements of currents $i_1$ and $i_2$. There are other conclusions that can be drawn but the foregoing amply demonstrates that the position of any point of current flow to or from element 10 can be accurately determined without regard for the impedance Z or the actual resistance of element 10.

Figure 2:
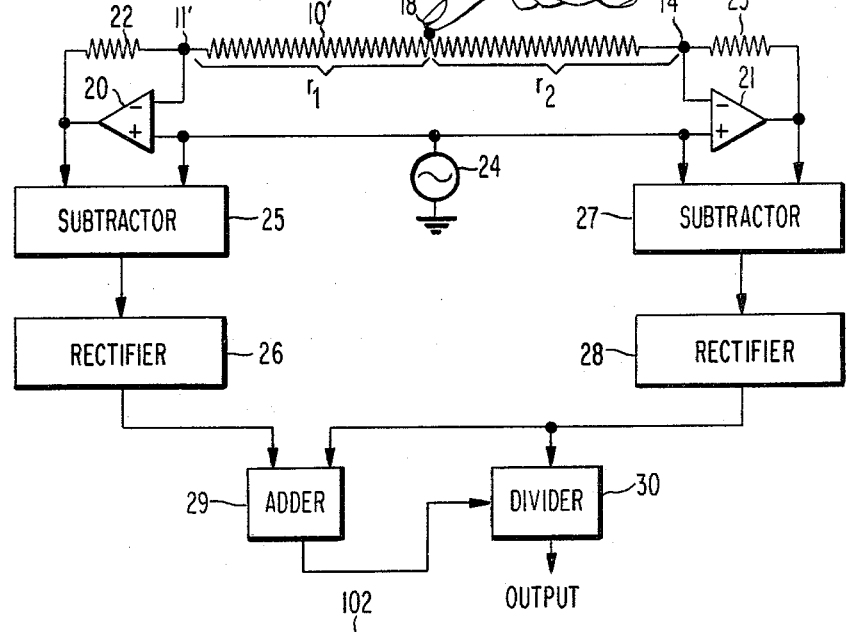
FIG. 2 is a block diagram of a one-axis touch panel incorporating the invention.

FIG. 2 is a simplified block diagram of a one-axis touch panel using the principle illustrated by FIG. 1. Extended resistance element 10' is in the form of a linear touch panel surface, so that resistance $r_1$ is directly proportional to the distance between end or boundary 11' and any selected touch point 18'. When the user's finger F touches the extended resistance element 10' at point 18', a small current flows through his body impedance, which is schematically represented by a lumped impedance 17', to ground. Operational amplifiers 20 and 21 maintain the ends 11' and 14', respectively, of the extended resistance element 10' at the same instantaneous potential as the a-c output of signal generator 24 by supplying currents through feedback resistors 22 and 23, respectively. The current through feedback resistor 23, which is equal in magnitude and opposite in polarity to the current through $r_2$, produces a voltage which is added to the output of signal generator 24 to give an instantaneous potential at the output of operational amplifier 21:

$$v_{21} = v_{24} - i_2 R_{23} \tag{5}$$

where $v_{24}$ is the voltage output of signal generator 24, $i_2$ is the current through $r_2$, and $R_{23}$ is the resistance of the feedback resistor 23. Subtractor 27 instantaneously removes the output voltage of signal generator 24 from $v_{21}$, and rectifier 28 converts the a-c signal into a d-c level proportional to the average magnitude of current $i_2$:

$$v_2 = \overline{|i_2|} R_{23} \tag{6}$$

Summing (adding) circuit 29 adds level $v_2$ to level $v_1$, which is similarly derived from the current through $r_1$ by means of similarly connected amplifier 20, subtractor 25 and rectifier 26. Divider 30 divides $v_2$ by the sum of $(v_1 + v_2)$ to give an output directly proportional to the position of point 18' on touch surface resistance 10':

$$v_{out} = \frac{v_2}{v_1 + v_2} = \frac{i_2}{i_1 + i_2} \tag{7}$$

Figure 3:
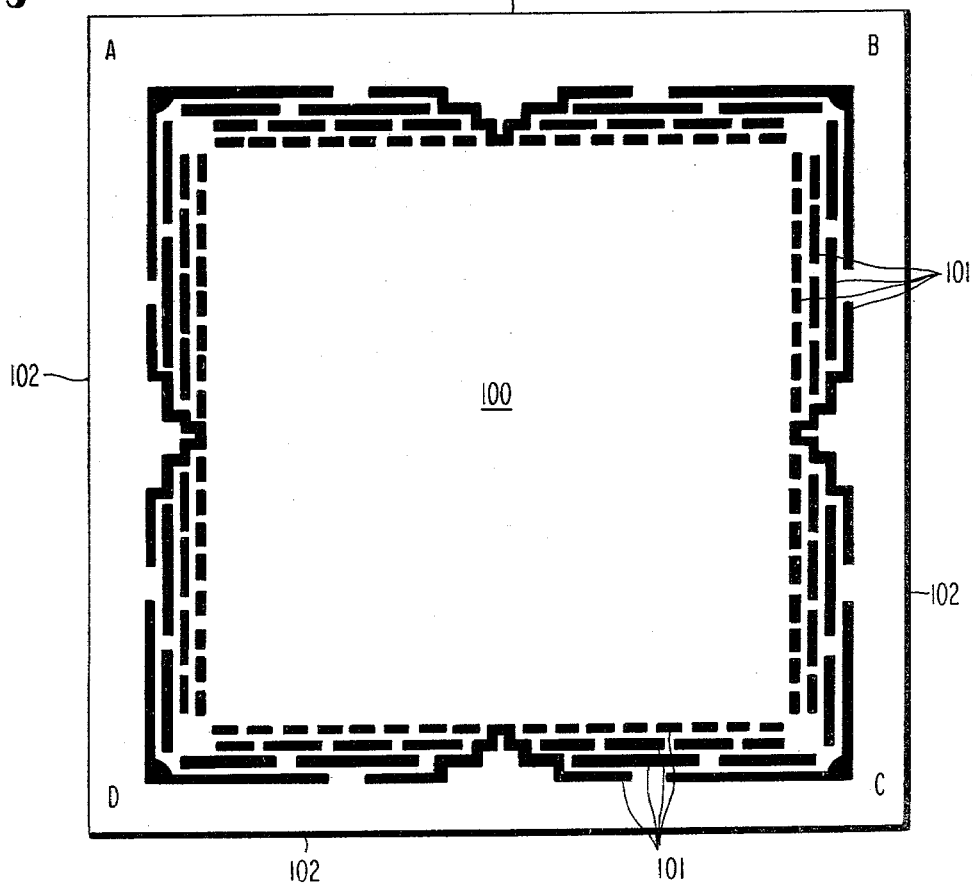
FIG. 3 shows a four-terminal pattern of conductive segments for use in a two-axis touch panel and corresponds to FIG. 7 as disclosed and claimed in my application Ser. No. 867,256.
Figure 7:
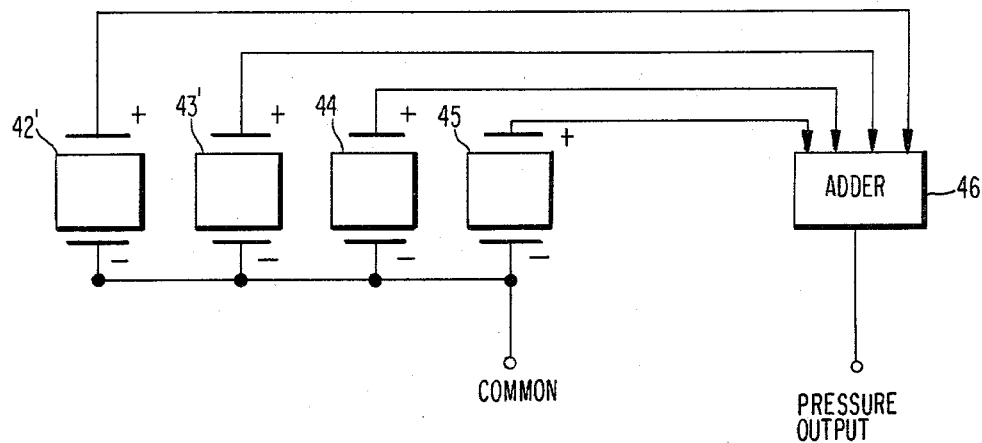
FIG. 7 is a block diagram of circuitry for sensing pressure on the touch panel shown in FIG. 6.

FIG. 3 is a modification of FIG. 7 of my pending patent application Ser. No. 867,256. It shows a pattern of conductive segments 101 that is inlaid or overlaid (as by silk screen printing) on a uniform sheet of resistive material 100 to produce what is termed a linearized resistive surface in my application Ser. No. 867,256. When appropriate voltages are applied to corner terminations A, B, C, and D, a uniform electric field with controllable amplitude and direction is created on the surface.

I have found that the structure of FIG. 3 has the following useful properties in addition to the useful properties disclosed in patent application Ser. No. 867,256: If the four terminations A, B, C, and D are held at the same instantaneous potential, and a spot on the surface is held at a different instantaneous potential, currents will flow through the four terminations. If there currents are measured with the spot (corresponding to selected touch point 18') at various locations, it can be shown that they are related to the X and Y coordinates of the spot by the equations:

$$x = k_1 + k_2 \frac{i_B + i_C}{i_A + i_B + i_C + i_D} \tag{10}$$

$$y = k_1 + k_2 \frac{i_A + i_B}{i_A + i_B + i_C + i_D}$$

wherein $k_1$ is an offset, $k_2$ is a scale factor, and $i_A$, $i_B$ etc. are the currents through the respective terminations. In FIG. 3, the edges 102 of resistive surface 100 are illustrated as extended solely for purposes of clarity in the drawing. In actual practice the resistive layer may be trimmed or limited to the outermost conductive segments 101.

Similar results have been obtained with a rectangular linearized resistive surface possessing a non-square aspect ratio and fabricated with the construction shown in FIG. 3 of my patent application Ser. No. 867,256. In this case constants $k_1$ and $k_2$ differ for the X and Y equations.

Figure 4:
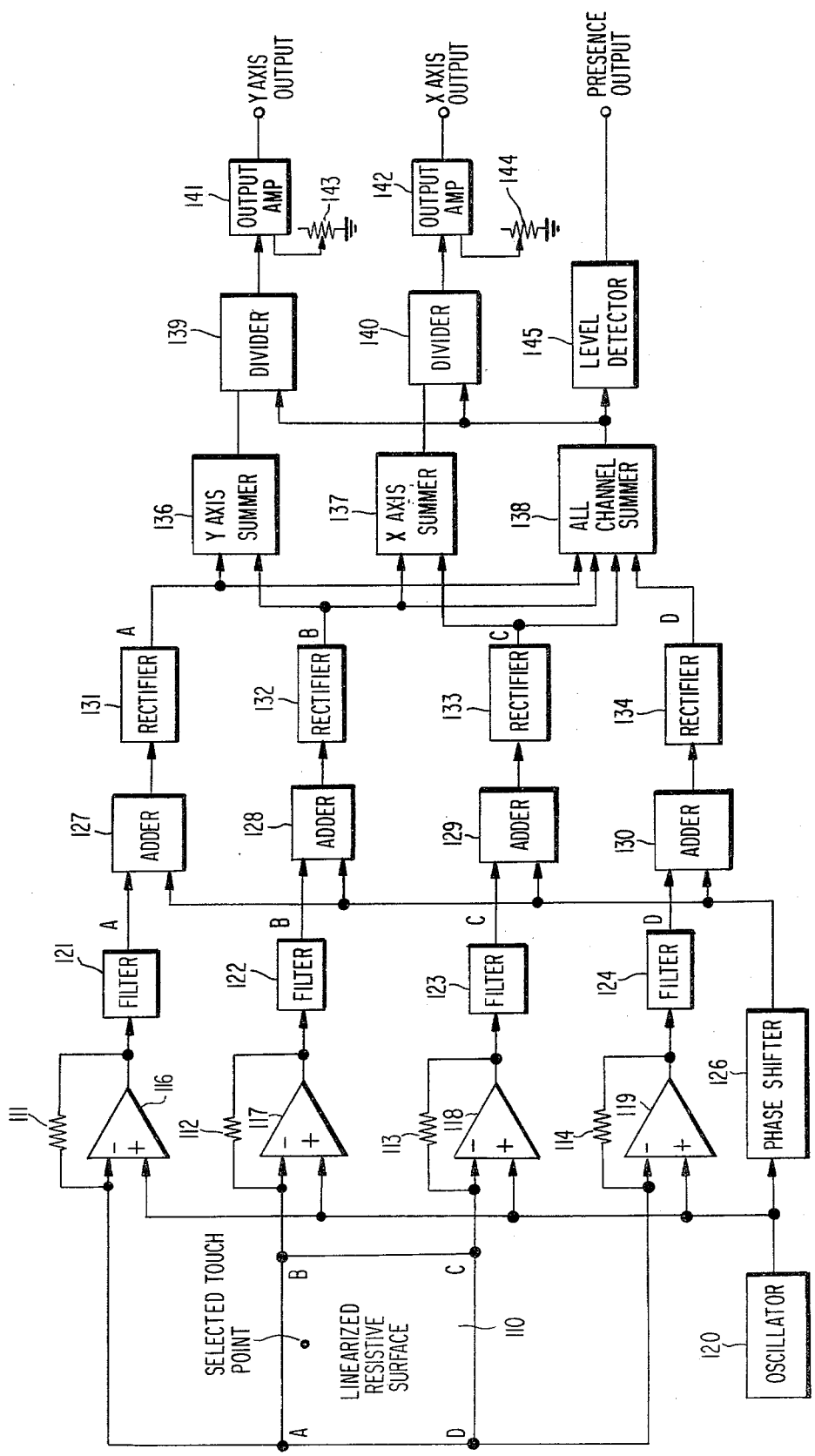
FIG. 4 is a block diagram of a two-axis touch panel incorporating the invention.

FIG. 4 is a block diagram of the preferred embodiment of the invention: a two-dimensional touch panel using the structure of FIG. 3. This embodiment is an extension to two dimensions of the principle embodied in FIG. 2, and its mathematical basis is as described in the discussion of FIG. 3.

When the linearized resistive surface 110 is touched by the user, small currents flow through the four terminations A, B, C, and D. Voltages proportional to these currents are developed across the feedback resistors 111, 112, 113, and 114 of the four input amplifiers 116, 117, 118 and 119, respectively, as the amplifiers follow the output of oscillator 120. The amplifier outputs are applied to four high-pass filters 121, 122, 123 and 124 respectively. These filters are not essential to system operation, but were added to eliminate the 60-Hz signals which may be picked up by the user's body from power wiring. Filters 121–124 attenuate 60-Hz signals while passing the oscillator 120 frequency, which is typically 20 kHz. In a later-disclosed embodiment, the 60 Hz (or any radiant ambient environmental energy field) may be used as a source of position signal energy for the touch panel surface.

Subtraction of the oscillator signal component from the filter outputs is accomplished by first shifting the phase of the oscillator signal approximately 180° in phase shifter 126 and then adding the phase-shifted signal to the filter outputs in adder circuits 127, 128, 129 and 130, respectively. The resulting signals are rectified in rectifiers 131, 132, 133 and 134, respectively, to provide d-c levels proportional to the amplitudes of the a-c signals. The levels corresponding to the top two terminations A and B of the linearized resistive surface 110 are summed by the Y-axis summer 136, the levels corresponding to the right-hand two terminations B and C are summed by the X-axis summer 137, and all four levels A, B, C and D are summed by the all-channel summer 138 to provide a denominator input for the two dividers 139 and 140. These dividers 139 and 140 then operate on the Y-axis and X-axis sums to perform the divisions of equation 10 above, and output amplifiers 141 and 142 with adjustable offset 143 and 144 and gain provide the desired X-axis and Y-axis outputs described by Equation 10. A level detector 145 monitors the all-channel summer 138 output and switches state when the user's finger touches the linearized resistive surface 110.

It is not necessary for the user's finger to make ohmic contact with the linearized resistive surface; a thin insulating layer may be deposited over the resistance material for protection, and capacitive coupling through the insulating layer will still provide adequate current for system operation.

Figure 5A:
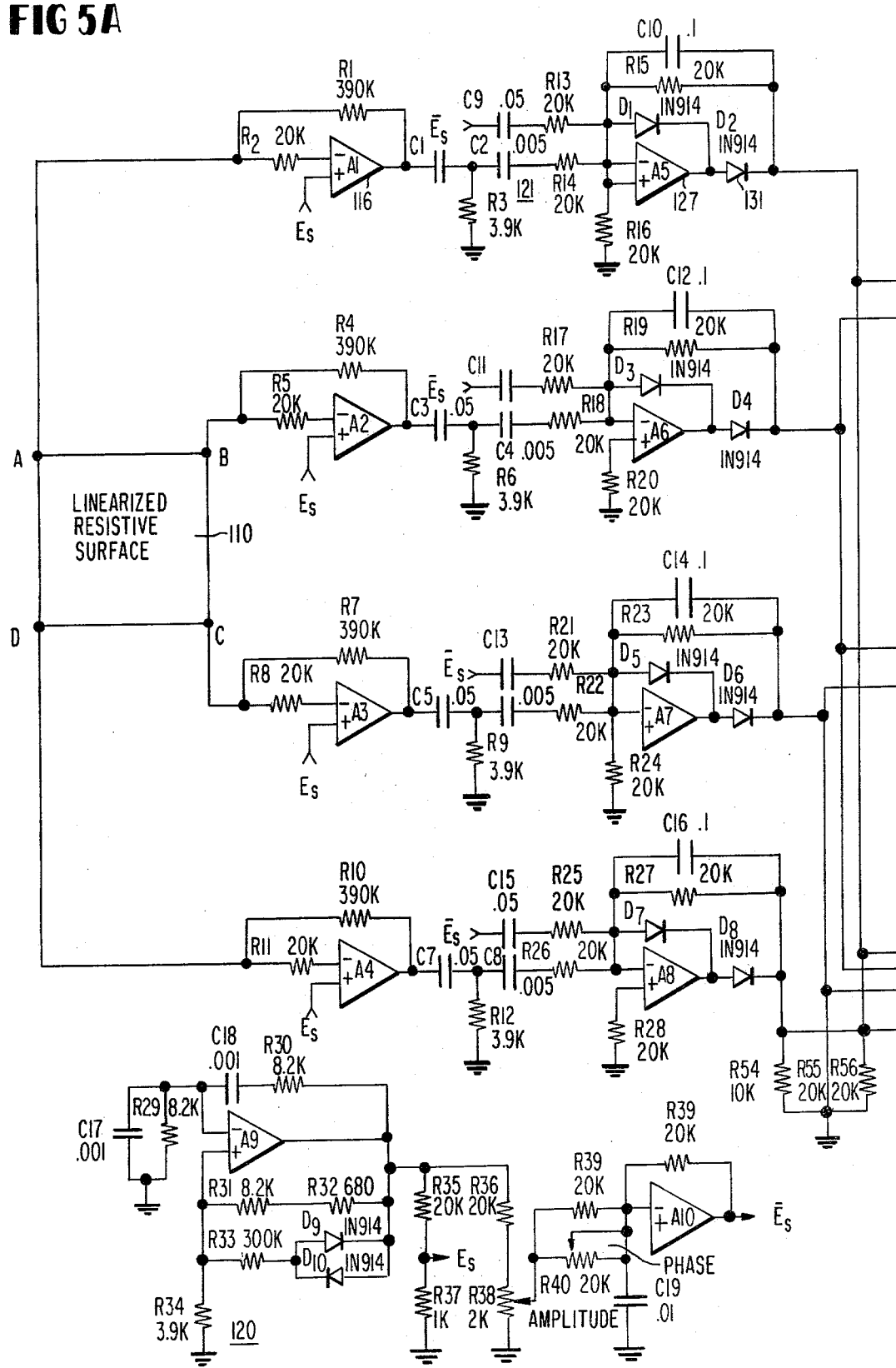
FIG. 5a and 5b taken together constitute a schematic diagram of the circuitry shown in block diagram form in FIG. 4.
Figure 5B:
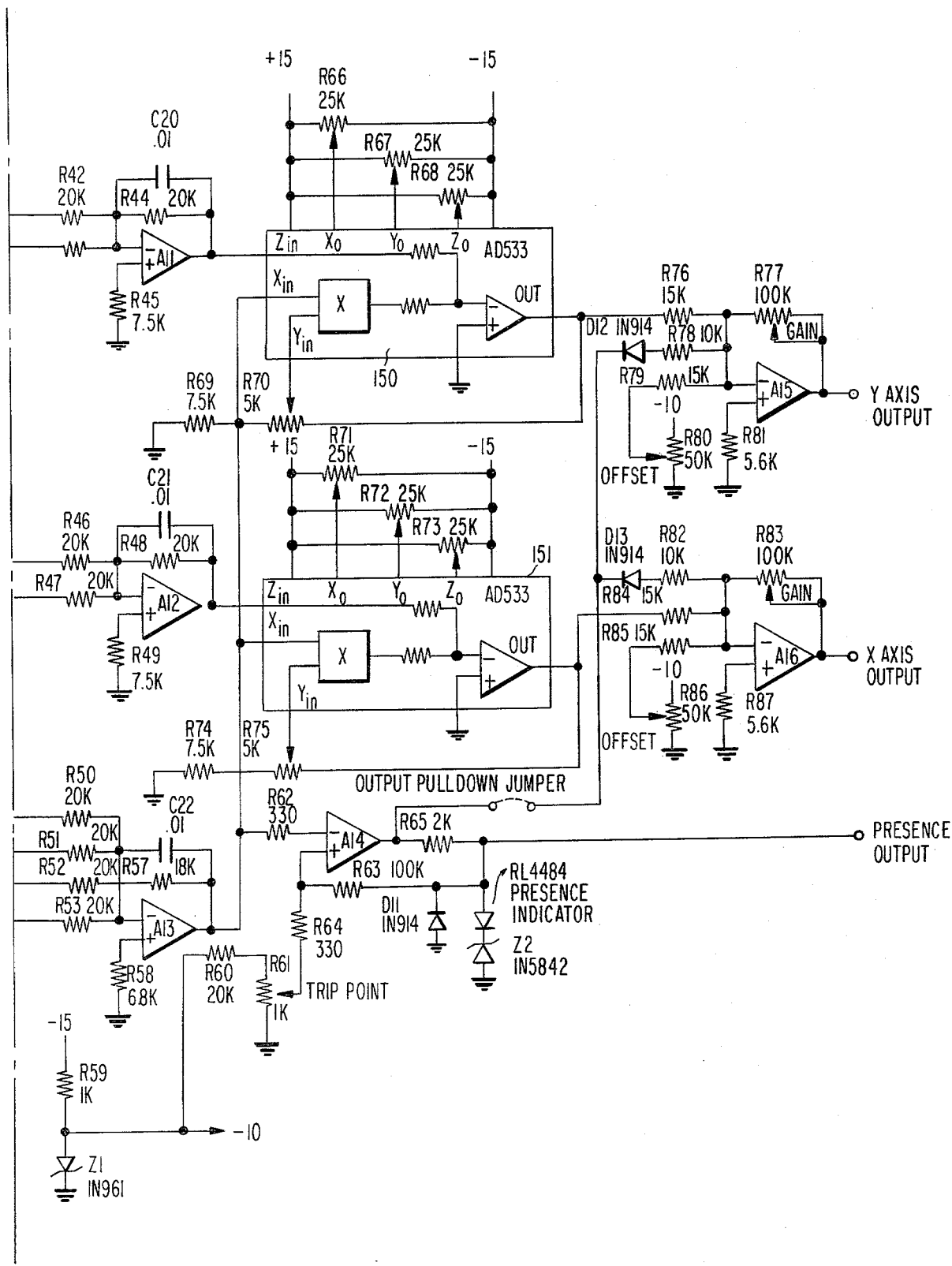

FIG. 5a and 5b taken together constitute a schematic diagram of the embodiment of the invention shown in FIG. 4. Termination A of the linearized resistive surface is connected to the inverting input of operational amplifier A1 through isolating resistor R2. The noninverting input is connected to Es, the output of a Wien-bridge oscillator (operational amplifier A9) through a voltage divider, consisting of R35 and R37 (all of which corresponds to oscillator 120 shown in the block diagram of FIG. 4), which provides a 20 kHz sine wave with a peak-to-peak amplitude of about 1.3 volts. The output of operational amplifier A1 goes through a filter 121 comprising capacitors C1 and C2 and resistors R3 and R14. The inverting input of operational amplifier A5 is used as a summing node (and hence corresponds to adder 127 of FIG. 4). A phase shifter, operational amplifier A10 (e.g. 126), inverts the oscillator output $E_s$ to provide an out-of-phase signal $\overline{E_s}$ which is coupled through capacitor C9 and is summed through resistor R13 to cancel $E_s$ at the input of A5 (adder 127). The amplitude and phase of $\overline{E_s}$ are adjustable, so that the effect of the capacitance between the linearized resistive surface 110 and ground can also be cancelled.

The circuit of operational amplifier A5 is a precision rectifier providing a d-c output for constant finger position, e.g., selected touch point. Identical circuitry is provided for the other three terminations B, C and D of the linearized resistive surface, using operational amplifiers A2, A3, A4, A6, A7 and A8.

Operational amplifier A11, constituting the Y axis summer 136 of FIG. 4, sums the rectified signals corresponding to terminations A and B; operational amplifier A12, constituting the X-axis summer 137 of FIG. 4, sums the signals corresponding to terminations B and C; and operational amplifier A13 constituting the all-channel summer of FIG. 4, sums all four signals A, B, C and D. Resistors R54, R55 and R56 equalize the loads on the four precision rectifiers A5, A6, A7 and A8.

Two AD533J analog multipliers 150 and 151 are connected to divide (e.g., perform the dividing function of dividers 139 and 140 of FIG. 4) the outputs of operational amplifiers A11 and A12 by the output of operational amplifier A13 (all-channel summer 138 of FIG. 4). Operational amplifiers A15 and A16 (corresponding to output amplifiers 141 and 142 of FIG. 4) are output scalers allowing variation of output gains and offsets over a wide range to match the characteristics of various utilization devices. Operational amplifier A14 (level detector 143 of FIG. 4) is a level detector with hysteresis and an adjustable trip point. When the linearized resistive surface 110 is touched at any selected touch point, a light-emitting diode provides a visual indication thereof and the Presence output switches from 0 to +5 volts. Diodes D12 and D13 and resistors R78 and R82 constitute a pull-down circuit to cause the X and Y outputs to go off-scale when the linearized resistive surface is not touched; removing a jumper disables this feature.

Figure 9:
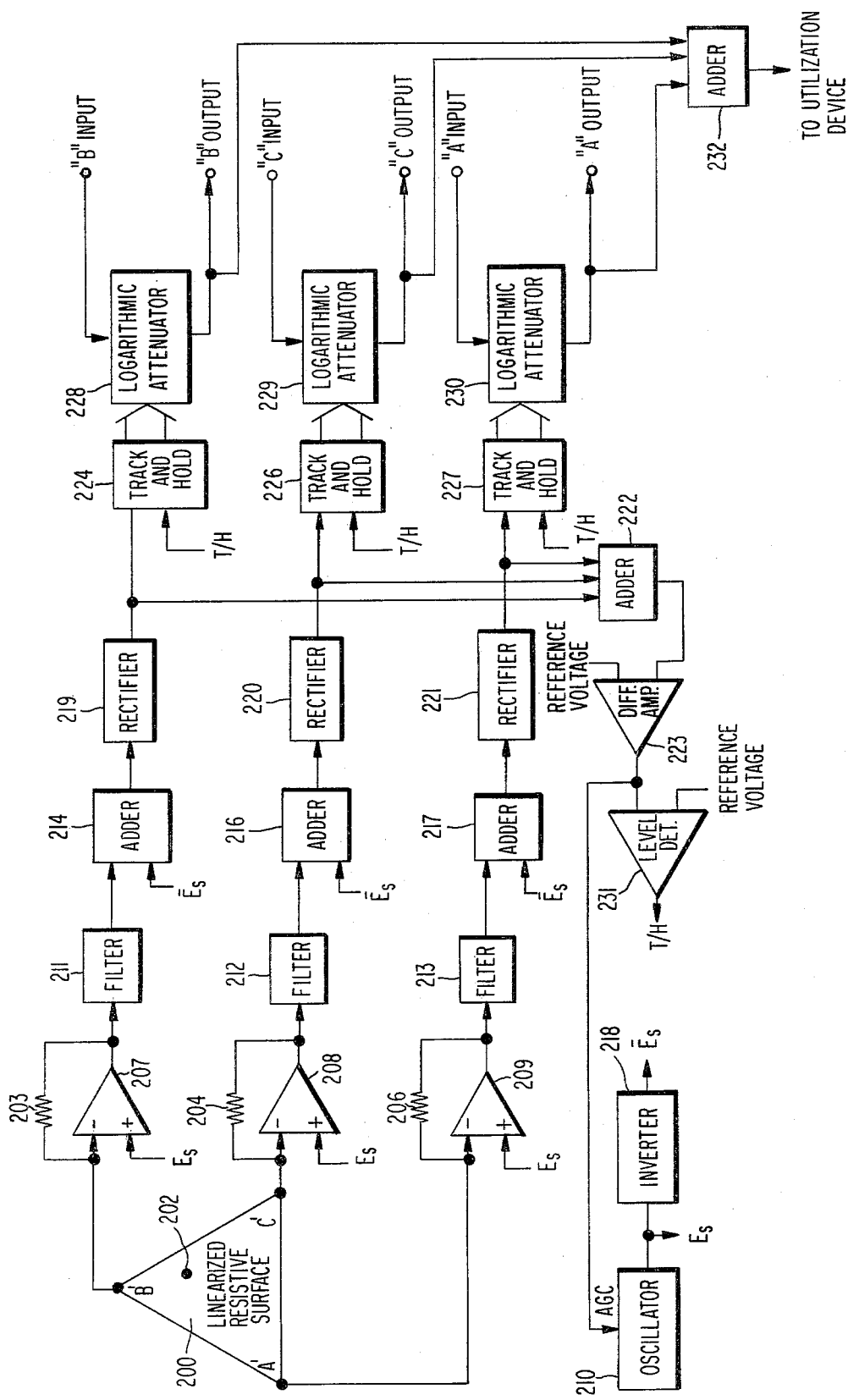
FIG. 9 is a block diagram of a three-channel audio mixer using the structure of FIG. 8.

It will be seen that many alternative techniques can be used to accomplish the same normalizing function as the dividers in FIGS. 4 and 5. For instance, digital outputs can be easily obtained by applying the X and Y axis sums to voltage-to-frequency converters, and counting the output pulses for a period of time proportional to the output of the all-channel summer. Analog normalization can be accomplished by controlling the gains of the input amplifiers with a feedback loop so as to maintain the output of the all-channel summer at a constant value. Another normalization technique is illustrated in FIG. 9.

Figure 6:
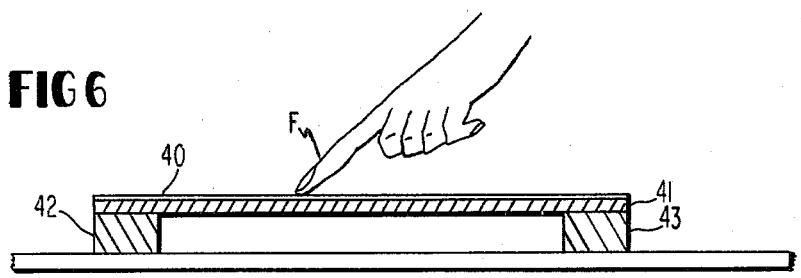
FIG. 6 is a cross-sectional diagram showing the construction of a touch panel incorporating pressure-sensing means.

FIG. 6 is a cross-sectional diagram showing a method of combining pressure-sensing transducers with the two-axis touch panel of FIG. 4. The touch panel's linearized resistive surface 40 is deposited on, or bonded to, a rigid supporting plate 41, each corner of which rests on one of four piezoelectric elements. Two of these, labeled 42 and 43, appear in FIG. 6.

FIG. 7 is a block diagram of the circuitry for summing the voltages developed by the four piezoelectric elements 42, 43, 44 and 45 of FIG. 6 to produce an output signal. One terminal of each of the four piezoelectric elements 42', 43', 44 and 45 is connected in common, with the same polarity being observed for all four elements. The other terminals are connected to four inputs of voltage-summing circuit 46. The voltage outputs of the four piezoelectric elements are summed by voltage-summing circuit 46 to provide a vertical axis output proportional to the net downward pressure exerted on the linearized resistive surface by the user's finger.

Figure 8:
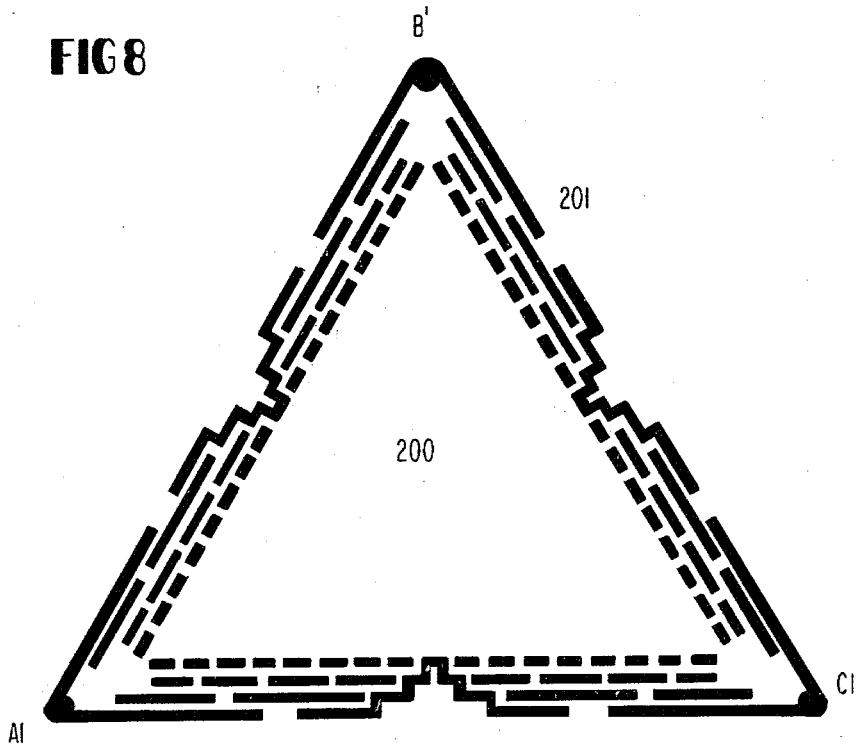
FIG. 8 is a three-terminal pattern of conductive segments for use in a two-axis touch panel or in a three-channel touch-controlled audio mixer.

FIG. 8 shows a triangular linearized resistive surface 200 using the edge termination system disclosed in my application Ser. No. 867,256. The geometry of the conductive segments 201 between each two corners is the same as the geometry of the conductive segments 101 between adjacent corners in FIG. 3. A uniform electric field can also be established in this triangular surface in a manner analogous to that described for the rectangular surfaces as described in patent application Ser. No. 867,256. In fact, it is possible to provide a uniform field, as disclosed in my above-identified patent application, in conjunction with the location-or position-detecting apparatus and method of the present invention.

I have found that if all three terminals A', B', C' are held at the same potential and a spot or selected touch point on the linearized resistive surface 200 is held at a different potential, the currents flowing through the terminations at corners A', B' and C' follow the relationship:

$$d_A = k_1 + k_2 \frac{i_A}{i_A + i_B + i_C} \quad (11)$$

wherein $d_A$ is the perpendicular distance from the side opposite corner A' to the current source; $i_A$, $i_B$ and $i_C$ are the currents through the corresponding terminations; and $k_1$ and $k_2$ are offset and scale constants.

It will be seen that, given any two of the three distances $d_A$, $d_B$ and $d_C$, the two-dimensional location of the selected touch point is determined. FIG. 9 is a block diagram of an audio mixer using the triangular linearized resistive surface 200 of FIG. 8. When the linearized resistive surface 200 is touched by the user at any selected touch point 202, currents flow through the terminations at corners A', B' and C'. Voltages proportional to these currents are developed across the feedback resistors 203, 204 and 206 of the three input amplifiers 207, 208 and 209, respectively as the amplifiers follow the output of oscillator 210. The amplifier outputs go to high-pass filters 211, 212 and 213, and the outputs of these filters are supplied to adders 214, 216 and 217 which receive the $\overline{E}_s$ signal from inverter 218 to remove the oscillator signal component as described above for the embodiment illustrated in FIG. 4. The resulting signals are rectified by rectifiers 219, 220 and 221 to produce d-c levels proportional to the currents through the three terminations A', B' and C' of the triangular linearized resistive surface 200. An adder 222 sums the three d-c levels.

In this implementation of my invention, the ratios required by Equation 11 are obtained by maintaining the sum of the three d-c levels at a constant amplitude with a feedback loop. As shown in FIG. 9, a differential amplifier 223 compares the sum of the three levels with a reference voltage. The output of differential amplifier 223 is used as an automatic gain control voltage to control the amplitude of the output of oscillator 210.

Each of the three d-c levels also goes to a digital track-and-hold circuit 224, 226 and 227. These circuits, the details of which are described in the literature (See the article by Eugene L. Zuch, entitled "Designing With A Sample—Hold Won't Be A Problem If You Use The Right Circuit", *Electric Design* Vol. 26 Number and 23 Nov. 8, 1978 page 84) of analog-digital interfaces, use a combination of digital and analog circuitry to follow an analog input in the track mode and provide a corresponding output in either analog or digital form. When these circuits switch from track to hold mode, a stored digital number maintains the output at its last value. The digital outputs of the track-and-hold circuits are connected to logarithmic attenuators 228, 229 and 230. These are nonlinear digital-to-analog converters whose details are described in the literature (See the article by Walter Jung and Will Retmamch entitled "Get Wide Range Digitally Controlled Audio Attenuation With A Companding D/A," Electronic Design, Vol. 26 Number 23 Nov. 8, 1978, page 92). Adder 232 combines the outputs of the attenuators to produce the mixer output.

Switching of the operating mode of the track-and-hold circuits 224, 226 and 227 is controlled by a level detector 231 analogous in function to the level detector of FIG. 4. When the user touches the linearized resistive surface 200, the presence of his finger is sensed by the level detector and the track-and-hold circuits 224, 226 and 227 are switched to the track mode of operation. When he removes his finger, the track-and-hold circuits 224, 226 and 227 switch to the hold mode and maintain the last attenuator settings until the user touches the touch panel again. It will be appreciated that besides use as an audio mixer this technique can be applied to various other arts where it is desired that a plurality of signal levels be provided at a single touch or input by the user.

FIG. 10 is a block diagram of another embodiment of the invention (shown in one-dimensional form) in which the terminations of the linearized resistive surface are maintained at ground potential and the body of the user serves as an antenna and picks up ambient electrical noise which causes current to flow through selected touch point 18" to the terminations 11" and 14".

This technique has the advantage that it imposes no voltage on the body of the user. Although the voltages and currents imposed on the user by the previously discussed embodiments are far below levels that can be felt, and even farther below levels that can do bodily harm, some corporations prefer that products they use impose no voltages or currents whatsoever on the user. Touch panels made using this technique should also be less expensive, as fewer circuit elements are required. In the touch panel of FIG. 10, stray voltages on the user's body cause currents to flow through extended resistance element 10" when it is touched at selected point 18". These currents flow to virtual ground at ends 11" and 14" of the resistance element. Ground potential is maintained at ends 11" and 14" by currents supplied through feedback resistors 22' and 23' by operational amplifiers 20' and 21'. Rectifiers 26' and 27' convert the output voltages of operational amplifiers 20' and 21' to d-c levels, which are summed by adder 29'. Divider 30' divides the amplitude of one level by the sum of both to produce an output proportional to the position of the point touched.

Figure 11:
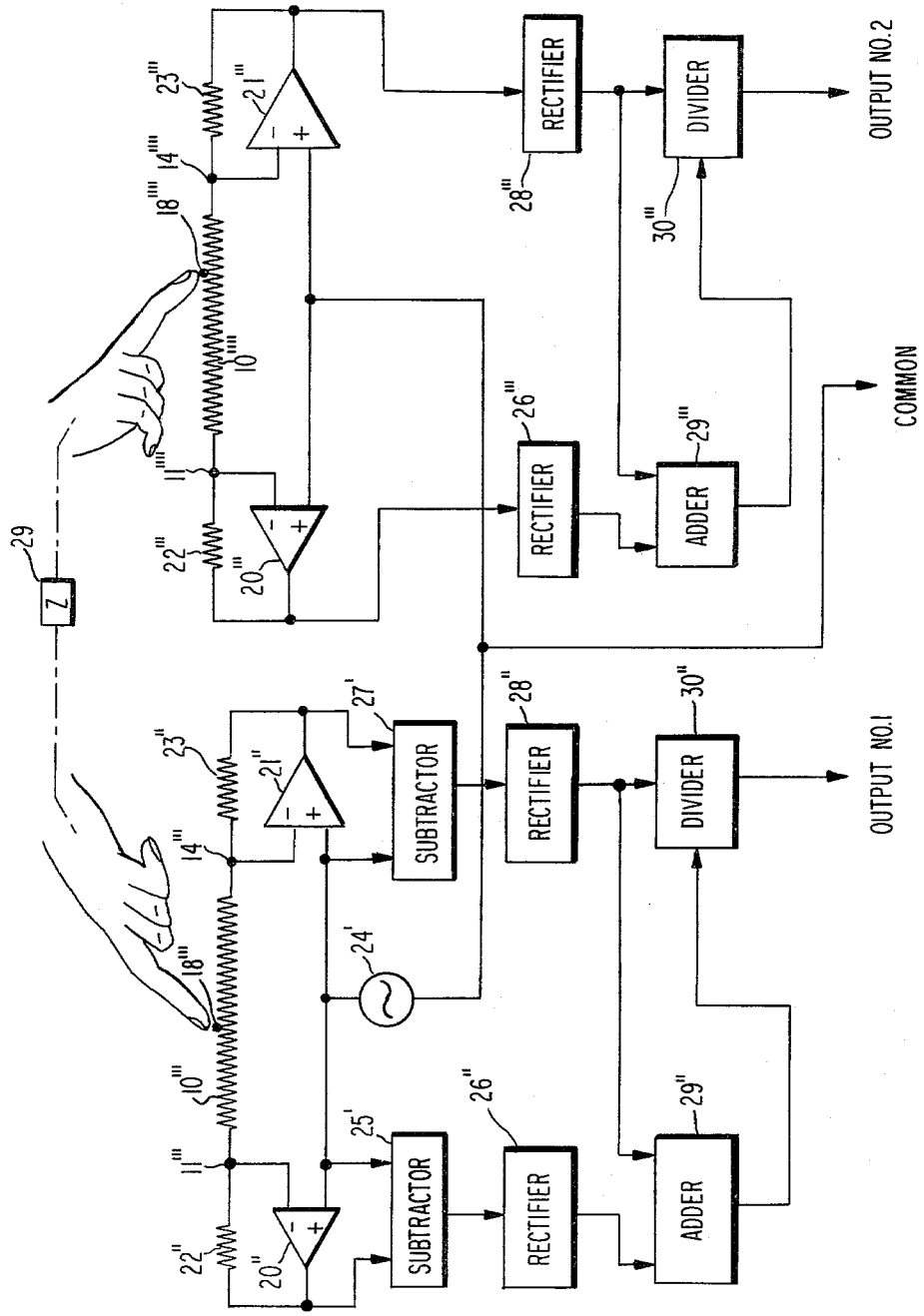
FIG. 11 shows a combination of two one-dimensional touch panels similar to those shown in FIG. 2 and FIG. 10.

FIG. 11 shows the combination of two one-dimensional touch panels similar to the embodiments of FIG. 2 and FIG. 10. Applications are envisioned for a multiplicity of one-axis touch panels, each operated by a different finger of the user, and for combinations of one-, two- and three-dimensional touch panels. Two one-axis touch panels can be maintained orthogonally related to provide X and Y coordinate readouts for various manually controlled devices. The circuit of FIG. 11 is preferably floating relative to ground, unlike the embodiments of FIG. 2 and FIG. 10, so that it is insensitive to the impedance to ground of the user's body and also insensitive to ambient electrical noise. The circuit relies instead on impedance 29, the impedance of the user's body between the points 18''' and 18'''', to simultaneously complete the circuits of FIG. 2 and FIG. 10.

FIG. 12 is a sketch of a contemplated embodiment of my invention in which the extended resistance element is a transparent linearized resistive surface 300 with a configuration similar to that of FIG. 3, and is combined with a display device. A suitable resistive surface for this purpose can be made by depositing indium tin oxide on transparent polyester film. The pattern of conductive segments 301 is then silk-screened on the resistive surface with silver-filled expoxy paint. A slight modification of the pattern of FIG. 3 allows each side 310, 311 (the other two sides are not shown in FIG. 12) of the pattern to be folded back around the display device, shown as a cathode ray tube 312 in FIG. 12, or otherwise masked from view. In this way the combination of display and resistive surface requires little more space than the display alone. The linearized resistive surface can also be fabricated directly on the display device if no implosion shield is needed between the display device and the user. Circuitry similar to that disclosed in FIG. 4 and FIG. 5 is also used in this embodiment.

FIG. 13 shows two touch panels, each similar to the embodiment of FIG. 4, incorporated in a video entertainment system. Touch panel 70 is used by player A and touch panel 71 is used by player B.

Player A's finger touching playing surface 72 (which is a replica of the playing surface on the TV display 75) causes generation of X-axis, Y-axis and Presence output signals for the touch panel 70. These output signals go to game circuitry 74, where they are converted to display information for video display 75.

Player A's playing surface 72 is framed by a portion of housing 73, and while it is shown as being rectangularly shaped so as to be a simulation of typical playing surfaces such as basketball, football, tennis, etc. other geometrical configurations, including non-planar surfaces, may be utilized. The function of player B's touch panel 71 is similar.

A representation of the game being played appears on video display 75. If it is a tennis game, for instance, a rectangular outline of the tennis court appears, with line 76 representing the net. The usual sound effects and scoring display (not shown) are produced by game circuitry 74. Player A's racket is represented by game element 77 and player B's racket is similarly represented by game element 78.

The players can move their fingers in all directions on their playing surfaces, and the displayed representations of their rackets will move in corresponding directions on the appropriate sides of the net. Techniques are well-known in the art for creating a representation of a ball and causing it to move, rebound from the rackets, etc.

It will be appreciated that touch panels 70 and 71 may utilize projected images of the playing surfaces that can be changed to represent several different games. Typically, the game can be varied widely, as is currently done with game cartridges provided by manufacturers such as Atari, Fairchild and Magnavox.

In addition, ball rebound velocity or other game characteristics can be controlled by pressure-sensing means similar to those in FIG. 6. If the game requires the firing of a gun or other discrete action, this can occur when pressure on the playing surface exceeds a certain threshold, for example. The same function can be accomplished by the Presence output of the touch panel if pressure-sensing means are not incorporated; e.g., the gun fires whenever the player lifts his finger from the playing surface.

Further details of the art of incorporating touch panels in video games are given in my pending patent application Ser. No. 873,568, filed Jan. 30, 1978 and incorporated herein by reference.

While I have disclosed several embodiments of the invention in its preferred form, it will be appreciated that various modifications and adaptations of the invention can be made without departing from the spirit and scope of the invention as set forth in the claims appended hereto.

I claim:

1. In an apparatus for locating a selected touch point on a current-conducting impedance surface having at least a pair of boundaries, the improvement comprising
   means for linearizing current flow to said boundaries,
   means for causing a linearized electrical current to flow through said selected touch point as the sum of separate currents passing through each of said boundaries, and
   means for translating said separate currents to at least one signal corresponding to the location of said selected touch point relative to said boundaries.

2. The invention defined in claim 1 wherein there are two pairs of boundaries with an X line passing through one boundary pair being orthogonal to a Y line passing through the other of said pair of boundaries,
   said means for translating said separate currents to a signal corresponding to location provides an output signal pair as the coordinates along said X and Y lines respectively from one boundary of each axis.

3. The invention defined in claim 1 wherein at least one of said boundaries lies along a straight line.

4. The invention defined in claim 1 wherein said means for causing an electrical current to flow includes providing a pathway to earth for radiant energy from ambient environmental sources.

5. Apparatus as defined in claim 1 including a track and hold circuit connected to receive at least one signal corresponding to the location of such selected touch point relative to said boundaries and effectively to store said signal at its last value and maintain same until the user touches the impedance surface again.

6. A method of detecting a selected touch point on a current-conducting impedance surface having at least a pair of spaced boundaries comprising the steps of
   causing an electrical current to flow through said selected touch point as the cumulative linearized current passing through those portions of said conductive impedance surface between said selected touch point and each boundary, respectively, and translating the electrical current flow through said portions to a signal corresponding to the location of said selected touch point relative to one of said boundaries.

7. Apparatus for detecting the position of a selected touch point on a current-conducting surface comprising, edge termination means defining two or more spaced apart edges of said current-conducting surface, the distance between said two or more spaced edges being predetermined, said edge termination means having terminals for connection to an external circuit, circuit means connected to said terminals of said edge termination means for maintaining said terminals at a predetermined instantaneous electrical potential at any time a linearized electrical current flows through said edges to any point on said surface between said edges, means for detecting a parameter of the linearized electrical currents through said terminals, and means for determining from the values of said detected parameter the location of said selected touch point on said surface at which said current is flowing from said edges, and producing at least one electrical signal corresponding to the said location of said selected touch point relative to at least one of said edges.

8. The invention as defined in claim 7 wherein said means for defining includes means for defining four orthogonally related edges of said surface, and said means for detecting includes means for detecting in two orthogonal axes the location of said point on said surface.

9. The invention defined in claim 7 wherein said means for maintaining said terminals at a predetermined instantaneous electrical potential includes means for periodically varying said electrical potential so as to create a varying difference in potential between said surface and earth, and said point on said surface is a point touched by a human finger, thereby causing currents to flow through said terminals and said human finger with the current flowing through said human finger including the sum of currents flowing through said terminals and the ratios of the currents flowing through said terminals to said sum of the currents being proportional and inversely proportional, respectively, to the position of said point on said surface relative to said edges.

10. The invention defined in claim 7 wherein said touch point is a point touched on said surface by a human finger, and further including means for varying the electrical potential of said finger to thereby cause electrical currents to flow through said finger into said point and to said edges of said surface.

11. The invention defined in claim 7 wherein said touch point is a point touched on said surface by a human finger and ambient electrical energy radiated from ambient environmental sources is coupled via said human finger to said point and said surface to cause thereby electrical currents to flow through said finger and said point to said edges of said surface, respectively.

12. The invention defined in claim 7 wherein said current-conducting surface consists essentially of resistive material and the measured parameter of electrical current through said edges is the amplitude of the current flowing through said edges, respectively.

13. The invention defined in claim 7 wherein said touch point on said surface is a point touched by a human finger and said invention further includes means for detecting the presence of said finger in proximity to said point on said surface and producing an electrical output signal indicating the presence or absence of said human finger at said point to said utilization device.

14. The invention defined in claim 7 wherein said touch point on said surface is a point touched thereby by human finger, and further including means for measuring the pressure exerted by said human finger against said surface and producing an electrical output signal that varies as a function of pressure and applying same to said utilization device.

15. The invention defined in claim 6 wherein direct electrical contact between said surface and a source or sink of current is required for operation thereof.

16. The invention defined in claim 7 further comprising a protective insulating layer over said surface, said current to said point being capacitively coupled through said insulating layer to a source or sink of currents.

17. The invention defined in claim 7 wherein said surface is transparent, and further comprising means for displaying visual information in substantially the same plane with said transparent surface such that each point on said surface is uniquely associated with a part of the displayed visual information.

18. The invention defined in claim 7 wherein said edge termination means defining two or more edges of a current conducting surface defines four edges of said surface, and said means for determining determines in two orthogonal axes normal to said edges the position on said surface of said point, and said point is a point touched on said surface by a human finger, and further including means for periodically varying said electrical potentials so as to create a varying difference of potential between said surface and earth thereby causing currents to flow through said edges and said human finger.

19. Apparatus as defined in claim 7 including a track and hold circuit connected to receive said at least one electrical signal corresponding to the said location of said selected touch point relative to at least one of said edges and effectively store said signal at its last value, and maintain same at said last value until said current conductive surface is touched again.

20. In a touch panel system having a resistive surface defined by two opposed pairs of edge terminations on said surface, a line passing through each edge pair being orthogonal to a line passing through the other edge pair, and having means for maintaining the terminals of said edge terminations of said surface at a predetermined instantaneous electrical potential, the method of locating a position on said surface comprising creating a potential difference between the terminals of said surface and a point touched on said surface by a human finger, placing said finger in proximity to said surface at any selected point such that current flows through said finger and said point to the terminals of said edge termination of said surface, measuring a parameter of said current flowing through said terminals, and converting said current measurements to a utilization signal and applying same to a utilization device.

21. In a touch panel system having an impedance surface element or layer bounded by at least three edge terminations for said surface, with at least three terminals for connecting external circuitry to said edge terminations, a method of determining the position of a selected touch point on said impedance surface, comprising,
   measuring electrical currents flowing through said terminals, and
   determining from said measurements the location of said selected touch point on said surface and producing an electrical signal corresponding thereto.

22. The method defined in claim 21 comprising the additional steps of storing said electrical signal, maintaining said stored signal in a storage element until said impedance surface is touched to cause electrical currents to flow through said terminals again.

23. A method of determining in two dimensions the location of a source or sink of electrical current on a current-conducting surface, comprising the steps of
   establishing at least three electrical connections to said surface, said surface possessing an electrical impedance that (1) is constant as a function of location or (2) is a known function of location,
   measuring the electrical currents that said source or sink causes to flow through said electrical connections, and
   determining the location of said source or sink of electrical current from the electrical measurements.

24. A method of determining the location on an extended current-conducting impedance surface, of a current-conducting pathway between said impedance surface and a point of common electrical potential comprising:
   establishing at least two electrical connections to said impedance surface, said impedance surface possessing an electrical impedance that (1) is constant as a function of location or (2) is a known function of location,
   establishing potential differences between said electrical connections and said point of common electrical potential,
   linearizing current flow through said connections,
   measuring the electrical currents that flow through said electrical connections, and
   determining the location of said current-conducting pathway from the electrical measurements.

25. A proportioning system for producing at at least three output terminals at least three signals which are functions of the position of a human finger at a selected touch point on a touch panel surface, comprising an impedance surface bounded by at least three current-conducting edges and at least three terminal means connecting said current-conducting edges to an external circuit, means for maintaining said terminal means at a selected instantaneous potential and means for establishing potential differences between said selected touch point and said terminal means whereby the ratio of current flow through any one of said terminal means to the total current through all of said terminal means is a function of the position of said selected touch point relative to said current-conducting edges.

26. An apparatus for simultaneously locating a selected touch point on each of at least two separate touchable surfaces, comprising:
   at least two current-conducting impedance surfaces, each of said impedance surfaces being bounded by edge-termination means with at least two terminals for connecting said edge-terminations means to an external circuit,
   means connected to said terminals for maintaining said terminals at predetermined instantaneous electrical potentials,
   means for creating an instantaneous difference in net electrical potential between said terminals of a first impedance surface and said terminals of at least one other impedance surface, such that when a current-conducting means is provided between a selected touch point on said first impedance surface and a selected touch point on said other impedance surface, electrical currents are caused to flow through said terminals of both said first impedance surface and said other impedance surface,
   means for detecting a parameter of the electrical currents through said terminals of both said first impedance surface and said other impedance surface, and
   means for determining from the values of said detected parameter the locations of said selected touch points on said impedance surfaces, and producing at least two electrical signals corresponding to said locations of said selected touch points.

27. Apparatus for determining the location in two dimensions of a point through which electrical current flows in a current-conductive impedance surface, comprising
   means making at least three spced apart electrical connections to said current conductive impedance surface,
   means for linearizing current flow through said at least three connections,
   means for simultaneously measuring the electrical currents flowing through said at least three connections to said point, and
   ratiometric means for determining the location of said point from said measurements of electrical current.

28. In a touch panel system having a resistive surface defined by two opposed pairs of edge terminations on said surface, a line passing through each edge pair being orthogonal to a line passing through the other of said opposed pairs of edged terminations, said edge terminations having terminals for connection to external electrical circuitry, improvement in the means for locating a selected touch point on said surface comprising
   means for maintaining the terminals of said edge termination at a predetermined instantaneous electrical potential,
   means for creating a potential difference between the terminals of said surface and a selected touch point on said surface through which electrical current passing through a human finger passes,
   and means for converting said current measurement to a utilization signal and applying said to a utilization device.

* * * * *

Disclaimer 4,293,734.—*William Pepper, Jr.*, Bethesda, Md. TOUCH PANEL SYSTEM AND METHOD. Patent dated Oct. 6, 1981. Disclaimer filed Apr. 7, 1982, by the assignee, *Peptek, Inc.*

Hereby enters this disclaimer to claims 23, 24 and 27 of said patent.

[*Official Gazette June 15, 1982.*]